(12) United States Patent
Xu

(10) Patent No.: US 10,866,159 B2
(45) Date of Patent: Dec. 15, 2020

(54) LARGE-AMPLITUDE VERTICAL-TORSIONAL COUPLED FREE VIBRATION DEVICE FOR WIND TUNNEL TEST

(71) Applicant: Dalian University of Technology, Dalian (CN)

(72) Inventor: Fuyou Xu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/481,431

(22) PCT Filed: Feb. 9, 2018

(86) PCT No.: PCT/CN2018/076000
§ 371 (c)(1),
(2) Date: Jul. 26, 2019

(87) PCT Pub. No.: WO2019/153247
PCT Pub. Date: Aug. 15, 2019

(65) Prior Publication Data
US 2020/0232876 A1    Jul. 23, 2020

(51) Int. Cl.
*G01M 9/06* (2006.01)
*G01M 9/02* (2006.01)

(52) U.S. Cl.
CPC .............. *G01M 9/06* (2013.01); *G01M 9/02* (2013.01)

(58) Field of Classification Search
CPC .......... G01M 9/04; G01M 9/02; G01M 9/062; G01M 9/06; G01M 9/065; G01M 9/08;
(Continued)

(56) References Cited

U.S. PATENT DOCUMENTS

| 2,448,528 | A | * | 9/1948 | Heuver | G01M 9/062 73/147 |
| 5,644,075 | A | * | 7/1997 | Hefer | G01M 9/04 310/328 |

(Continued)

FOREIGN PATENT DOCUMENTS

| CN | 202793734 U | 3/2013 |
| CN | 107345846 A | 11/2017 |

(Continued)

OTHER PUBLICATIONS

Written Opinion PCT/ISA/237 dated Nov. 5, 2018 in PCT/CN2018/076000 with English translation, 13 pages.

(Continued)

*Primary Examiner* — Andre J Allen
(74) *Attorney, Agent, or Firm* — Muncy, Geissler, Olds & Lowe, P.C.

(57) ABSTRACT

A large-amplitude vertical-torsional coupled free vibration testing device for wind tunnel test. The large-amplitude vertical-torsional coupled free vibration device for wind tunnel test includes rigid deck model, lightweight rigid rods, lightweight rigid circular aluminium hubs, the first thin strings, linear tensile vertical springs, and the second lightweight strings. Large-amplitude vertical-torsional coupled free vibrations of rigid deck models can be realized by using this device, in which the springs vertically deform without any tilt. In the traditional free vibration device, the spring may obviously tilt, and the linear torsional stiffness cannot be ensured. The device can be conveniently installed and the initial angle of attack can be easily adjusted. The extreme low and stable mechanical damping ratio required for large-amplitude vibrations can be readily guaranteed, owing to the invocation of the negligible rolling friction between the thin strings and the hub.

4 Claims, 1 Drawing Sheet

(58) Field of Classification Search
CPC ........... G01M 17/007; G01M 17/0074; G01M 9/067; G01M 10/00; G01M 15/14; G01M 17/0072; G01M 13/027; G01M 17/0076; G01N 15/02; G01N 15/0205; G01N 25/02; G01N 33/28; G01N 11/02; G01N 13/00; G01N 15/10; G01N 19/02; G01N 2011/0093; G01N 2015/1062; A63G 2031/005; A63G 31/00; A63G 31/16
USPC .......................................................... 73/147
See application file for complete search history.

(56) References Cited

U.S. PATENT DOCUMENTS

| | | | | |
|---|---|---|---|---|
| 6,088,521 | A * | 7/2000 | Strumolo | G01M 9/08 703/8 |
| 2013/0186192 | A1 * | 7/2013 | Uehara | G01M 9/08 73/118.03 |
| 2018/0045601 | A1 * | 2/2018 | Hartmann | G01M 17/0074 |
| 2018/0335364 | A1 * | 11/2018 | Skube | G01M 9/04 |
| 2019/0195729 | A1 * | 6/2019 | Knestel | G01M 17/0074 |
| 2019/0219475 | A1 * | 7/2019 | Xu | G01M 9/062 |
| 2020/0072699 | A1 * | 3/2020 | Xu | G01M 9/04 |

FOREIGN PATENT DOCUMENTS

| | | |
|---|---|---|
| CN | 108414186 A | 8/2018 |
| JP | S60164233 A | 8/1985 |
| JP | 2001041846 A | 2/2001 |
| SU | 614669 A1 | 3/1981 |

OTHER PUBLICATIONS

Office Action dated Mar. 14, 2019 in corresponding CN Application 201810129639.8 with English translation, 12 pages.

* cited by examiner

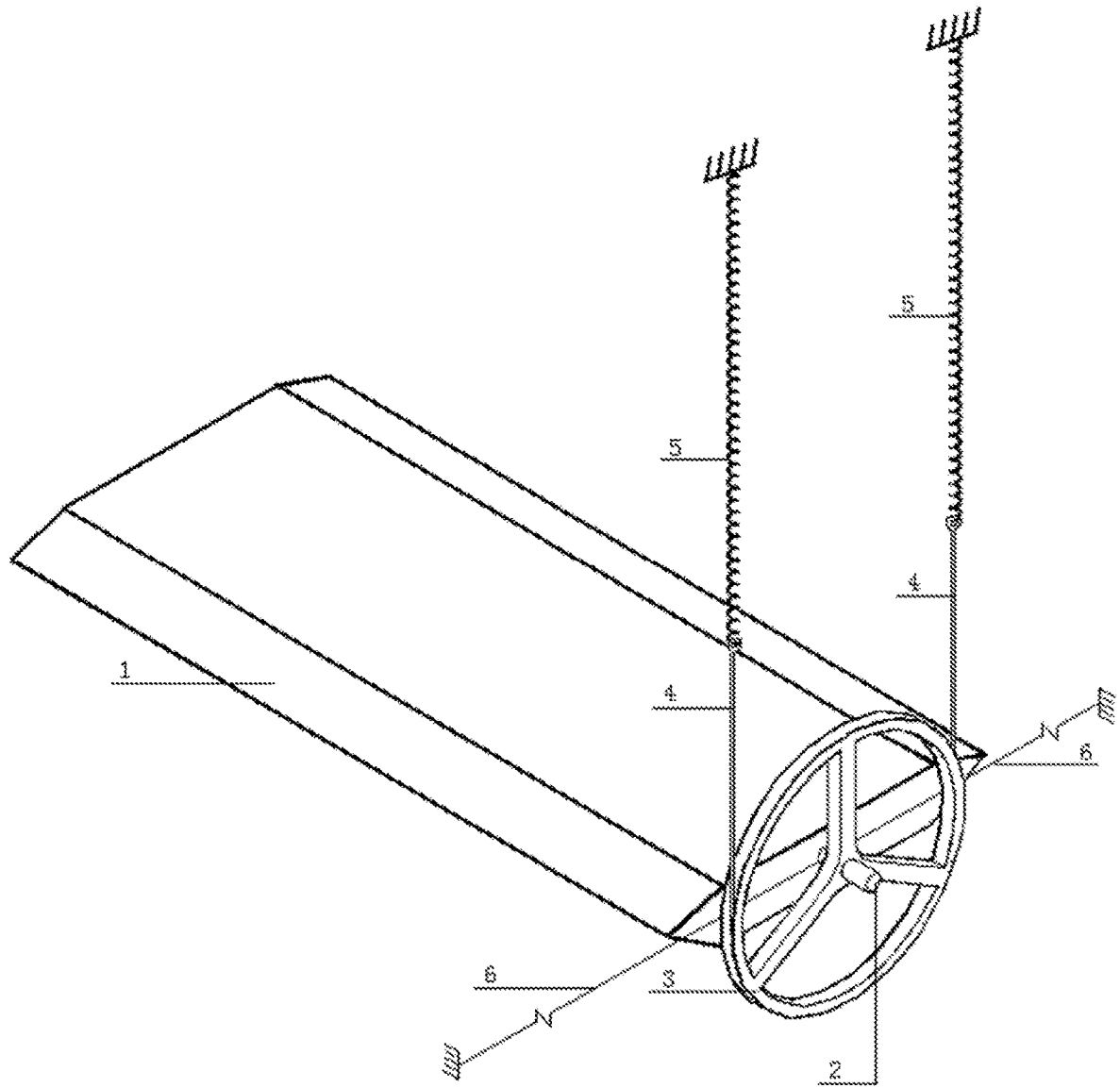

LARGE-AMPLITUDE VERTICAL-TORSIONAL COUPLED FREE VIBRATION DEVICE FOR WIND TUNNEL TEST

TECHNICAL FIELD

The invention is a wind tunnel test device which can realize large-amplitude vertical-torsional coupled free vibration and assure linear stiffness of torsional and vertical modes. The system includes the linear vertical tensile springs, rigid deck model, lightweight rigid rods, lightweight rigid circular hubs, high-strength thin strings. The large-amplitude vertical-torsional coupled free vibration of the rigid model can be transformed into the vertical deformation of linear springs. The linear vertical translational and torsional stiffness of the system can be realized by the linear tensile rigidity of springs and the rigid circular hubs. During the large-amplitude coupled vibration, the mass, and mass inertia of the system keep unchanged, and thus the vertical translational frequency and torsional frequency keep constants.

TECHNICAL BACKGROUND

In wind tunnel tests, the vertical-torsional coupled free vibration is one major method for deck vibration (vortex, buffeting, galloping, flutter) measurement and identification of flutter derivatives. For the traditional coupled free vibration testing device, the deck sectional model is suspended by springs, and the apparatus is very simple and convenient. For the small-amplitude coupled vibrations, the vertical springs tilt a little, and the springs vertical stiffness is approximately linear. However, for large-amplitude torsional vibrations, the vertical springs obviously tilt and the springs geometrical stiffness cannot keep linear. Therefore, the system vertical and torsional stiffness cannot keep constants, and they heavily rely on the amplitude. Consequently, unacceptable testing errors may be incurred. The larger vertical-torsional coupled vibration amplitude, the larger tilt of vertical springs, and the larger testing errors. It is generally considered that the error can be ignored when the torsional amplitude is lower than 2°. For large-amplitude torsional vibrations, e.g., when the old Tacoma Narrows Bridge was destroyed by wind loads, the torsional amplitude reaches amazing 35°. These wind-induced vibrations cannot be experimentally investigated by using the traditional testing device. Even the torsional amplitude only attains 10°, the results may be completely wrong.

SUMMARY

The invention can solve the following technical problem: In order to satisfy with the requirement of large-amplitude vertical and torsional coupled free vibration of sectional models of bridge deck and other structural members in wind tunnel test, a novel testing device is provided to effectively avoid various nonlinear factors involved in the traditional device and ensure large-amplitude vertical-torsional coupled linear free vibration. The new device includes rigid deck model, lightweight rigid rods, lightweight rigid circular hubs, the first thin strings, linear tensile vertical springs, and the second thin strings.

The technical scheme of the invention:

A large-amplitude vertical-torsional coupled free vibration device for wind tunnel test, includes rigid deck model 1, lightweight rigid rods 2, lightweight rigid circular hubs 3, the first thin strings 4, linear tensile vertical springs 5, and the second thin and lightweight strings 6; The rigid rods 2 are fixed at both ends of the model 1. The rigid rods 2 are horizontally passed through the center of the hubs 3 and fixed by screws to ensure that the torsional center of the model 1 is concentric with those of the rigid rods 2 and the hubs 3; The lower half of hub 3 with groove is surrounded by the first thin string 4. The lower end of the first string 4 is fixed at the bottom of the hub 3, and the upper end of the first string 4 is connected with the lower end of the vertical spring 5. During the vertical-torsional coupled free vibration of both model 1 and hubs 3, hubs 3 rotate along the first strings 4, the second strings 6 restrict the lateral vibration of model 1. When the model 1 perform the vertical-torsional coupled free vibration, the first strings 4 and the springs 5 moving up and down, springs 5 are vertically tensioned without any tilt.

The diameter of hub 3 is determined according to several parameters such as mass, mass inertia, and the ratio of the torsional frequency to the vertical bending frequency, and is generally in the range of 0.2 m to 1.5 m. When the diameter of the hub 3 is in the range of 0.2 m-0.7 m, the hub 3 can generally use a bicycle hub, which is very convenient and can be obtained at low cost. The hub 3 with a larger diameter can be made by lightweight rigid aluminum alloy materials.

The linear tensile stiffness of the first thin strings 4 and the second thin strings 6 are much larger than those of the vertical springs 5. The thin strings 4 and 6 are characterized by light weight, high strength, and negligible torsional and bending rigidity. The hub 3 can be freely surrounded by the first string 4. The second string 6 can freely rotate around its connection points and vibrates with model 1. For general rigid testing model 1, its mass and vibration frequency are not too high, and thus many thin strings on the market can meet the requirement.

The first thin string 4 is unnecessary to be fixed at the bottom of the hub 3 as long as the connection point between the hub 3 and the first string 4 is not higher than the tangent point between the first string 4 and the hub 3 during the vibration process. The connection point between the spring 5 and the first string 4 is not lower than the tangent point between the first string 4 and the hub 3.

The described hub 3 is unnecessarily a complete circular shape. Parts of the hub 3 can be cut off to reduce its mass. During the whole vibration process, the hub 3 should be always partially surrounded by part of the first string 4. A part of the first string 4 should keep upright together with the vertical spring 5.

The second thin string 6 has the characteristics of light weight, high strength, no bending and torsion resistance. Because the model 1 also vertically vibrates, and the second thin string 6 will rotate around its one fixed point. The tensile stiffness of the second thin string 6 should not be too large, otherwise the vertical vibration of model 1 will be restrained. The length of the second thin string 6 ranges from 1.5 to 3 m to accommodate the vertical-torsional coupled vibration of the rigid model 1. The second string 6 can be slightly pre-tensioned in still air.

The advantages of the invention: The deck model vertical-torsional coupled vibration is realized by the vertical deformation of the springs without any tilt, and the linear stiffness requirement can be met. In addition, during the whole free vibration process, the following parameters keep unchanged: the linear tensile springs stiffness, the system mass and inertia of moment, the force arm length of the circular hub. Therefore, the system vertical and torsional stiffness and vibration frequency keep constants. It successfully avoids the geometric nonlinearity and stiffness nonlinearity caused by the tilted springs in the traditional testing device. If only the single freedom of vertical vibration occurs, the four springs at the two ends of model have the same direction of flexible deformation. If only the single freedom of torsional vibration occurs, the two springs arranged at the two sides of each end have the opposite direction of flexible deformation, and the two springs on the windward or leeward side have the same direction of flexible deformation. If the coupled vertical and torsional vibration occurs, the four springs flexible deformations are linearly superimposed by the same and opposite direction. The testing device has the following advantages: (1) Low cost. Compared to the conventional testing device, the rigid hub and the thin strings substitute the horizontal bar connected spring 5 and the rigid rods 2. Bicycle hub can be used for the cases with a diameter in the range of 20-70 cm. They are easy to buy on the market at a low price (ranges from tens to hundreds Chinese Yuan, aluminium alloy, carbon steel). They are very light (not exceed 2 kg), with sufficient high strength and stiffness. Large diameters (generally not exceeding 150 cm) can be made by aluminum alloy material at low cost. (2) Convenient installment and adjustment. The difficulty for installment such a new device is similar to that of the traditional device. (3) Simpler adjustment of initial angle of attack. It can be realized by using the method for traditional device. It can also be more conveniently set by pre-rotating the specified angle of the hub prior to the test. (4) Large-amplitude coupled free vibration tests that are impossible for the conventional devices can be conducted by using this new skill, which is the most significant advantage of the device. (5) The rolling friction between the string and the hub is very small, and the corresponding mechanical damping is very low. Even the torsional amplitude (one side) attains 20°, the mechanical damping ratio can be controlled lower than 0.5%.

DESCRIPTION OF THE DRAWINGS

The sole FIGURE is a structural diagram of large-amplitude vertical-torsional coupled free vibration device for deck wind tunnel test.

1 rigid deck model; 2 lightweight rigid rod; 3 lightweight rigid circular hub; 4 the first thin string; 5 linear tensile vertical spring; 6 the second thin string.

DETAILED DESCRIPTION

Combining the technical scheme and attached drawing, the specific implementations of this invention are shown as follows:

As shown in the sole FIGURE, a large-amplitude vertical-torsional coupled free vibration device is composed of rigid deck model 1, lightweight rigid rods 2, lightweight rigid circular hubs 3, the first thin string 4, linear tensile spring 5, and the second thin string 6; The rigid rods 2 are fixed at both ends of the rigid model 1. The rigid rods 2 are vertically passed through the center of the hubs 3 and fixed by screws to ensure that the torsional center of the model 1 is concentric with those of the rigid rods 2 and the hubs 3; The lower half of hub 3 with groove is surrounded by the first thin string 4; The lower end of the first string 4 is fixed at the bottom of the hub 3, and the upper end of the first string 4 is connected with the lower end of the vertical spring 5. During the vertical-torsional coupled free vibration of both model 1 and hub 3, hub 3 roll along the first string 4, the second string 6 restricts the lateral vibration of model 1, the first string 4 and the spring 5 moving up and down, the spring 5 only generates the vertical tensile deformation and without any lateral tilt. Therefore, the linear coupled vibration can be ensured, and the vibration frequencies remain constants.

The invention claimed is:

1. A large-amplitude vertical-torsional coupled free vibration device for wind tunnel test, wherein the device includes rigid deck model, lightweight rigid rods, lightweight rigid circular aluminium hubs, first thin strings, linear tensile vertical springs, and second lightweight strings; The rigid rods are fixed at both ends of the rigid model; the rigid rods are perpendicularly passed through the centers of two hubs and fixed by screws to ensure that the torsional center line of the model is concentric with those of the rigid rods and the hubs; the lower half of hub is surrounded and supported by the first thin string, one end of the first string is fixed at the bottom of the hub, and the other end is connected with the lower end of the vertical spring; during the vertical-torsional coupled free vibration of both model and hubs, hubs rotate along the first strings, the second strings restrict the lateral vibration of rigid model, the first strings and the springs moving up and down, the springs only generate vertically tensile deformation without any lateral tilt; during the vibration, the connection point between the hub and the first string is not higher than the tangent point between the first string and the hub; the connection point between the spring and the first string is not lower than the tangent point between the first string and the hub, which means the spring should not contact with the hub to avoid collision.

2. The large-amplitude vertical-torsional coupled free vibration device for wind tunnel test according to claim 1, wherein the described lightweight rigid circular hub has a diameter of 0.2 m-1.5 m.

3. The large-amplitude vertical-torsional coupled free vibration device for wind tunnel test according to claim 2, wherein upper and lower parts of the described hub are cut off to reduce its mass; during the whole vibration process, the hub should be always partially surrounded by part of the first string; a part of the first string should keep upright together with the spring.

4. The large-amplitude vertical-torsional coupled free vibration device for wind tunnel test according to claim 1, wherein the length of the second string ranges from 1.5 m to 3 m; which can freely rotate around its fixing point to accommodate the vertical and torsional vibration of the model.

* * * * *